United States Patent
Imhof

(10) Patent No.: US 10,531,554 B2
(45) Date of Patent: Jan. 7, 2020

(54) GRATING MAGNETO OPTICAL TRAP

(71) Applicant: Utah State University Research Foundation, North Logan, UT (US)

(72) Inventor: Eric Imhof, Calabasas, CA (US)

(73) Assignee: Utah State University Space Dynamics Laboratory, North Logan, UT (US)

( * ) Notice: Subject to any disclaimer, the term of this patent is extended or adjusted under 35 U.S.C. 154(b) by 0 days.

(21) Appl. No.: 16/290,521

(22) Filed: Mar. 1, 2019

(65) Prior Publication Data
US 2019/0200445 A1    Jun. 27, 2019

Related U.S. Application Data

(62) Division of application No. 15/431,492, filed on Feb. 13, 2017, now Pat. No. 10,278,275.
(Continued)

(51) Int. Cl.
| | |
|---|---|
| *H05H 3/00* | (2006.01) |
| *H05H 3/04* | (2006.01) |
| *H05H 3/02* | (2006.01) |
| *G02B 27/42* | (2006.01) |
| *G21K 1/00* | (2006.01) |

(52) U.S. Cl.
CPC .......... *H05H 3/04* (2013.01); *G02B 27/4233* (2013.01); *G21K 1/006* (2013.01); *H05H 3/02* (2013.01)

(58) Field of Classification Search
CPC .......... G21K 1/006; G21K 1/00; G04F 13/02; H05H 3/02
See application file for complete search history.

(56) References Cited

U.S. PATENT DOCUMENTS

| | | | |
|---|---|---|---|
| 7,816,643 B2* | 10/2010 | Hyodo | H05H 3/04 |
| | | | 250/251 |
| 8,405,021 B2 | 3/2013 | Anderson et al. | |

(Continued)

FOREIGN PATENT DOCUMENTS

GB          2558574 A  *  7/2018  ........... G02B 5/1861

OTHER PUBLICATIONS

McGilligan, James P., et al. "Phase-space properties of magneto-optical traps utilising micro-fabricated gratings." Optics express 23.7 (2015): 8948-8959. (Year: 2015).*

(Continued)

*Primary Examiner* — Wyatt A Stoffa

(57) ABSTRACT

A three-dimensional magneto-optical trap (3D GMOT) configured to trap a cold-atom cloud is disclosed. The 3D GMOT includes a single input light beam having its direction along a first axis, an area along a second and third axis that are both normal to the first axis, and a substantially flat input light beam intensity profile extending across its area. The 3D GMOT may also include a circular, diffraction-grating surface positioned normal to the first axis and having closely adjacent grooves arranged concentrically around a gap formed in its center. The circular, diffraction-grating surface is configured to diffract first-order light beams that intersect within an intersection region that lies directly above the gap and suppresses reflections and diffractions of all other orders. The 3D GMOT may further include a quadrupole magnetic field with its magnitude being zero within the intersection region.

4 Claims, 9 Drawing Sheets

Related U.S. Application Data

(60) Provisional application No. 62/294,454, filed on Feb. 12, 2016.

(56) References Cited

U.S. PATENT DOCUMENTS

| | | | |
|---|---|---|---|
| 8,835,833 B2* | 9/2014 | Du | G21K 1/006 250/251 |
| 8,921,764 B2 | 12/2014 | Loftus et al. | |
| 9,117,563 B2 | 8/2015 | Hughes et al. | |
| 2010/0200739 A1* | 8/2010 | Anderson | G21K 1/006 250/251 |
| 2010/0320995 A1 | 12/2010 | David | |
| 2011/0290991 A1* | 12/2011 | Booth | C23C 14/221 250/251 |
| 2013/0048846 A1 | 2/2013 | Du et al. | |
| 2015/0200029 A1 | 7/2015 | Hughes et al. | |
| 2017/0359888 A1 | 12/2017 | Imhof | |
| 2018/0233337 A1* | 8/2018 | Hughes | H01J 41/16 |

OTHER PUBLICATIONS

Imhof, Eric, Two-Dimensional Grating Magneto-Optical Trap in 87Rb, Presentation at the Air Force Research Laboratory, Sep. 16, 2016, Kirtland Air Force Base, Albuquerque, NM.

Nshii, et al., A surface-patterned chip as a strong source of ultra-cold atoms for quantum technologies, Nature Nanotechnology 8, 321-324, Apr. 7, 2013.

Pollock, et al., Characteristics of integrated magneto-optical traps for atom chips, New Journal of Physics 13 (2011) 043029, Apr. 19, 2011.

Vangeleyn, Matthieu, Atom trapping in non-trivial geometries for micro-fabrication applications, PhD Dissertation, University of Strathclyde, 2011, U.K.

Imhof, Eric A., Development of Compact, Deployable Sensors Using Cold Atom Interference, PhD Dissertation, Air Force Institute of Technology, Jun. 15, 2017, Air Force Institute of Technology, U.S.

Imhof, et al., Two-Dimensional Grating Magneto-Optical Trap, Mar. 23, 2017, Atomic Physics, Cornell University Library, U.S.

Nshii, C. C., et al. "A surface-patterned chip as a strong source of ultracold atoms for quantum technologies." Nature nanotechnology 8.5 (2013): 321.

Lu, Z. T., et al. "Low-velocity intense source of atoms from a magneto-optical trap." Physical review letters 77.16 (1996): 3331.

Lee, J., et al. "Sub-Doppler cooling of neutral atoms in a grating magneto-optical trap." JOSA B 30.11 (2013): 2869-2874.

Vangeleyn, Matthieu, et al. "Laser cooling with a single laser beam and a planar diffractor." Optics letters 35.20 (2010): 3453-3455.

* cited by examiner

GRATING MAGNETO OPTICAL TRAP

CROSS-REFERENCE TO RELATED APPLICATIONS

This application claims priority to Unites States Non-provisional application Ser. No. 15/431,492, entitled "Grating Magneto Optical Trap," filed Feb. 13, 2017 for Eric Imhof, which claimed priority to Unites States Provisional Application Ser. No. 62/294,454, also entitled "Grating Magneto Optical Trap," filed Feb. 12, 2016 for Eric Imhof, both of which are incorporated herein by reference.

GOVERNMENT SPONSORED RESEARCH

This invention was made with government support under contract HQ0147-11-D-0052 awarded by the Air Force Research Laboratory. The government has certain rights in the invention.

TECHNICAL FIELD

The present disclosure relates to magneto optical traps.

BACKGROUND

A magneto optical trap (MOT) is the primary method by which dilute gasses of atoms and molecules are taken from room temperature to the sub-Kelvin range. It is the first step in many experiments and technologies related to high-accuracy atomic clocks, cold atom gyroscopes and accelerometers used in inertial navigation devices, magnetic field sensors, quantum computing, and gravimeters used to detect underground tunnels, aquifers, or other underground natural resources.

A MOT uses laser beams and magnetic fields to collect a high density of atoms with low kinetic energy. For example, a three-dimensional MOT can collect a small cloud, approximately 4 mm across, of super-cooled atoms where the average speed of an atom in the MOT is on the order of 0.1 meters per second. This is compared to atoms at room temperature moving at hundreds of meters per second.

Prior methods of creating three-dimensional MOTs used six counter-propagating light beams pointed along the cardinal axes towards a common intersection to capture cold atoms. See, for example, Matthieu Vangeleyn's PhD thesis at the University of Strathclyde, entitled "Atom trapping in non-trivial geometries for micro-fabrication applications." Another method replaces two of the six beams with mirrors. Still another method uses a single laser with a corner-cube reflector or reflecting right cone to capture atoms within the reflector.

SUMMARY

The inventor of the present disclosure has identified that present methods for creating magneto optical traps (MOT or MOTs) severely restrict optical access to the experimental chamber containing the cold atom cloud. Using current methods, lines of sight into the experimental chamber are blocked by input light beams or reflectors, leaving little room for imaging cameras, magnetic field sources, experimental lasers, or other methods of experimentally manipulating the cold atom cloud. Prior methods are also limited in their ability to quickly load a MOT with a high number of cold atoms necessary to perform cold-atom applications described above.

The present disclosure in aspects and embodiments addresses these various needs and problems by providing a unique grating magneto optical trap (GMOT). Both a two-dimensional (2D) and a three-dimensional (3D) GMOT are described. In embodiments, a 2D GMOT can provide a stream of cold atoms that can be captured in a 3D GMOT above a planar surface, loading the 3D GMOT much more quickly and enabling the experimenter to interact from all sides without obstruction. Additionally, the GMOT requires less laser power as compared to other MOTs. Also, most of the design requirements for a working MOT are satisfied through the design of the grating, alleviating many concerns about alignment, cost, size, and reproducibility. Finally, experimental results of the GMOT show a high-atom number and the ability to perform sub-Doppler cooling.

The benefits of using gratings apply equally well to a 3D GMOT as a 2D GMOT. If loaded by a cold atom beam from a 2D GMOT, a 3D GMOT is a compelling source for cold atom experiments. The atomic beam from a 2D GMOT enables higher atom number and loading rates in the 3D GMOT by separating the source vapor from the experimental region.

DETAILED DESCRIPTION

Figure 1:
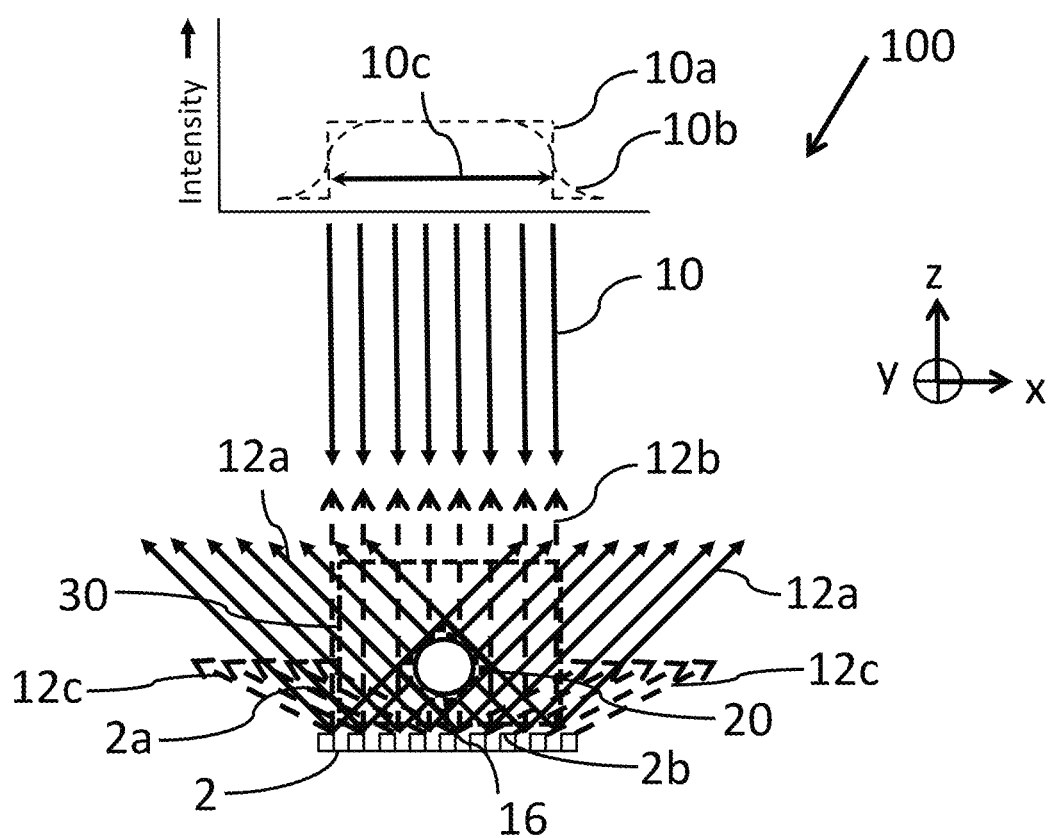
FIG. 1 illustrates the input, reflected, and diffracted light beams of a two-dimensional magneto optical trap (2D GMOT)

The present disclosure covers apparatuses and associated methods for grating magneto optical traps (GMOTs). In the following description, numerous specific details are provided for a thorough understanding of specific preferred embodiments. However, those skilled in the art will recognize that embodiments can be practiced without one or more of the specific details, or with other methods, components, materials, etc. In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. Thus, the following more detailed description of the embodiments of the present invention, as illustrated in some aspects in the drawings, is not intended to limit the scope of the invention, but is merely representative of the various embodiments of the invention.

In this specification and the claims that follow, singular forms such as "a," "an," and "the" include plural forms unless the content clearly dictates otherwise. All ranges disclosed herein include, unless specifically indicated, all endpoints and intermediate values. In addition, "optional," "optionally," or "or" refer, for example, to instances in which subsequently described circumstance may or may not occur, and include instances in which the circumstance occurs and instances in which the circumstance does not occur. The terms "one or more" and "at least one" refer, for example, to instances in which one of the subsequently described circumstances occurs, and to instances in which more than one of the subsequently described circumstances occurs.

FIG. 1 illustrates light beams and a diffraction grating of a 2D GMOT 100. In embodiments, a single input light beam 10 is directed along a first axis, in this figure labeled the z-axis. Input light beam 10 has a width 10c along a second axis, in this figure labeled the x-axis. Input light beam 10 also has an ideal intensity profile 10a distributed across the input light beam width 10c. In practice, input light beam's intensity profile is more like the Gaussian-shaped intensity profile 10b. The intensity profile 10a or 10b is intentionally made to be substantially flat or uniform across the width 10. In this disclosure, a substantially flat or uniform intensity profile means that the intensity of one part of input light beam 10 is substantially equal to another part of input light beam 10 across the effective width 10c of the light beam 10.

2D GMOT 100 also includes a diffraction grating 2 with a diffraction grating surface 2a. The diffraction-grating surface 2a is positioned normal to the first axis, or normal to the incident, input light beam 10. The diffraction-grating surface is also comprised of closely adjacent parallel grooves 2b spread across the width 10c of input light beam 10. In this embodiment, the closely adjacent parallel grooves 2b run parallel to the third axis. The third axis is normal to both the first and second axes, labeled the y-axis in the figures.

The diffraction grating surface 2a reflects zeroth order light beams 12b and diffracts first-order and other order light beams 12a and 12c, respectively. In embodiments, the diffraction grating surface 2a diffracts first-order light beams that intersect within an intersection plane 20 that lies within a plane defined by the first and second axis. In this configuration, the input light beam 10 also intersects with the first-order light beams 12a at the intersection plane 20.

The cooling of atoms in a magneto-optical trap occurs through Doppler cooling. Opposing beams of light with the correct frequency and polarization may strike an atom such that the atom absorbs a photon and receives a small push in the direction of the striking light beam.

In embodiments, the relative light intensities of the input light beam 10 and the first-order diffracted light beams 12a are configured to provide the necessary forces to help push atoms towards the center of the intersection plane 20. In other words, for a trap to form, the sum of the forces on the atoms should be approximately zero. Accordingly, $I_{up} = I_1/n \cos \theta$, where $I_{up}$ is the upward intensity from the diffracted first-order light beams 12a, $I_1$ is the intensity of the single input light beam 10, n is the number of diffracted first-order light beams 12a (in the case of this 2D GMOT embodiment, n equals two), and θ is the angle of the diffracted first-order light beams 12a (in the case of this 2D GMOT embodiment, θ equals 45). Additionally, the diffracted first order light beams 12a are spatially compressed, meaning their intensity is greater within a smaller area, by a factor of cos θ. Thus, in the case of the 2D GMOT described herein, $I_{up} = I_1/2$, or the diffracted first order light beams 12a should have an intensity that is roughly 50% of the single input light beam 10.

In addition, in this embodiment, the diffraction grating surface 2a suppresses reflections 12b and diffractions of all other order light beams 12c. As such, the inventor of the present disclosure has found that small deviations, on the order of +/−10%, in the intensity ratio (between the diffracted first order light beams 12a and the single input light beam 10) still produces a trap but moves the location of the trap with respect to the magnetic field zero. Thus, a trap may still be formed when the diffracted first-order light beams' intensity is between roughly 40 and 60% of the incoming light beam's intensity. The reflection suppression by the diffraction grating surface 2a and the intensity matching of the incoming light beam 10 and first-order diffracted light beams 12a provide a combined force that helps push atoms towards the center of the magneto-optical trap 100 or the center of the intersection plane 20.

Doppler cooling alone will slow the motion of an atom but it will not reverse an atom's direction of travel or, in the case of a magneto-optical trap 100, collect cold atoms at the center of the intersection plane 20. Once an atom stops moving, it sees no Doppler shift and will no longer absorb photons from the input light beam 10 or the first-order diffracted light beams 12a. The presence of a magnetic field is necessary to trap atoms at the center of the intersection plane 20.

Figure 2:
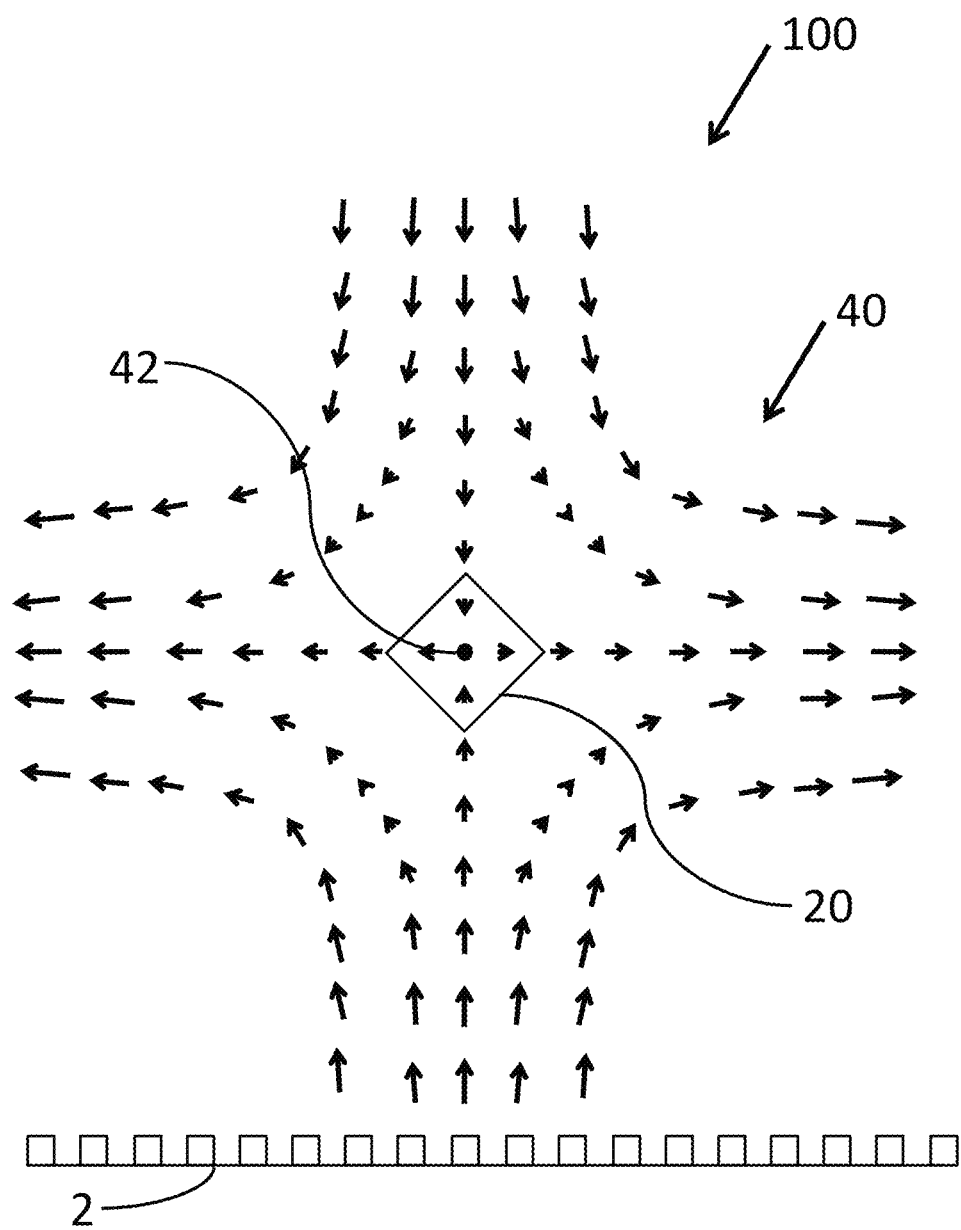
FIG. 2 illustrates the quadrupole magnetic field of a 2D GMOT.

Magneto-optical trap 100 further comprises a quadrupole magnetic field. For clarity purposes, the quadrupole magnetic field that is part of the magneto-optical trap 100 is not shown in FIG. 1 but is shown in FIG. 2 with its position relative to the intersection plane 20. A magnetic field at any given point may be specified as having both a direction and a magnitude. However, if the magnitude is zero at a given point, the direction is also zero. FIG. 2 shows the quadrupole magnetic field 40 with its force and direction being zero at the center of the intersection plane 20. In this embodiment, the quadrupole magnetic field 40 has a magnitude of zero along the third axis and is centered at the center of the input light beam's width 10c, or at the center of the intersection plane 20.

Figure 3:
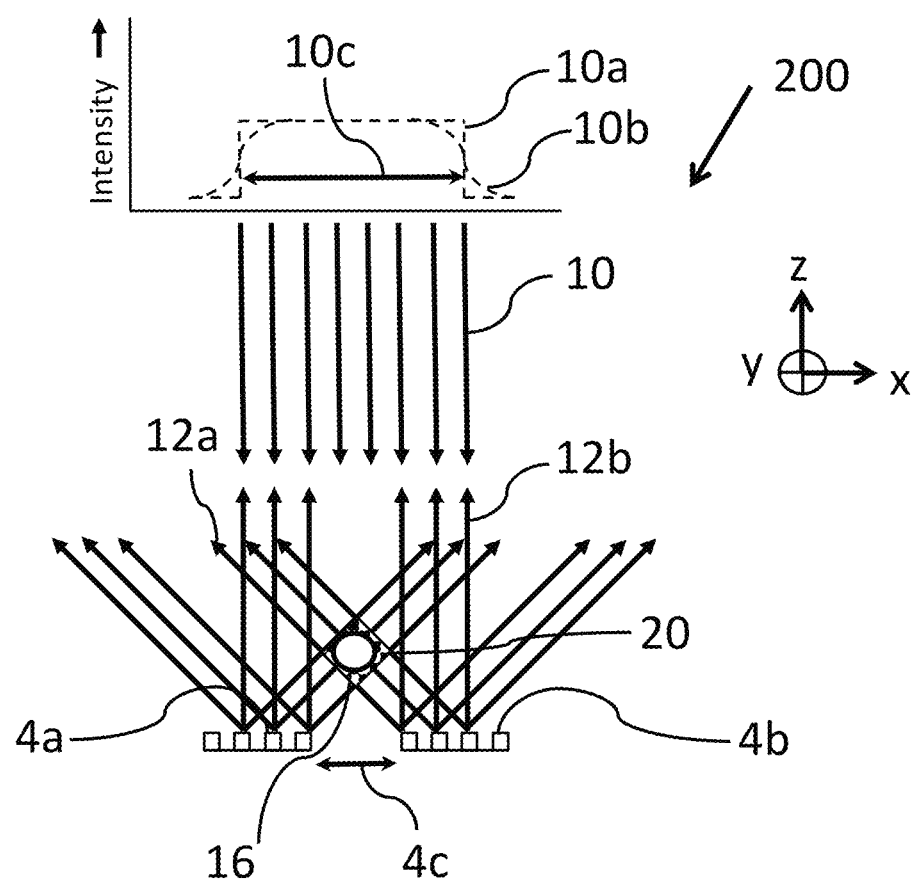
FIG. 3 illustrates the input, reflected, and diffracted light beams of another 2D GMOT.

FIG. 3 illustrates another embodiment of a magneto-optical trap 200. In this embodiment, the diffraction-grating surface is comprised of two diffraction grating surfaces 4a and 4b separated by a gap 4c, which is formed by the separation between the diffraction grating surfaces 4a and 4b. The gap 4c extends parallel to the third axis and is centered, relative to the second axis, at the center of the intersection plane 20.

The diffraction grating surfaces 4a and 4b in 2d GMOT trap 200 need not suppress reflections and diffractions of all other orders because of the gap 4c between the surfaces 4a and 4b. In this embodiment, input light beam 10 is not reflected back into the intersection plane 20 but instead passes through the gap 4c. Instead, this embodiment may use a less expensive or lower quality diffraction grating while achieving the same atom trapping results.

The 2D GMOTs 100 and 200 do not constrain atom movement along the third axis. As such, in embodiments, a magneto optical trap such as magneto optical trap 100 or 200 provides a stream of cooled atoms or an atom beam 16 flowing along the third axis that may feed into a three-dimensional magneto-optical trap (3D GMOT).

Figure 4:
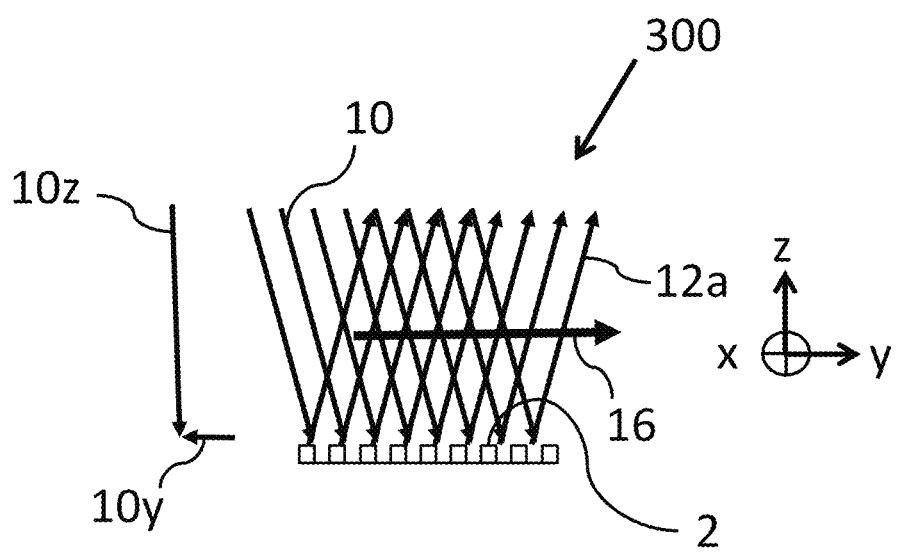
FIG. 4 illustrates a directed input light beam and the corresponding reflected, and diffracted light beams of a 2D GMOT.

FIG. 4 illustrates a side-view of another magneto optical trap 300. In this embodiment, the input light beam 10 has a vector component 10y that is parallel to the third axis. Vector component 10y helps produce a stream of cooled atoms or an atom beam 16 flowing in the same direction as the vector component 10y.

The vector component 10y points opposite the atom beam 16 direction to provide Doppler cooling along the beam 16. This may be done by having a beam opposite along 10y with a mirror reflecting the beam back onto the atom beam (i.e. the mirror, not shown, would be on the far right of the figure). The mirror would have a small hole in it through which the atom beam 16 could pass. Alternatively, in another embodiment, there is no mirror but just an angled beam 10 such that vector 10y is opposite the atom beam 16.

Figure 5:
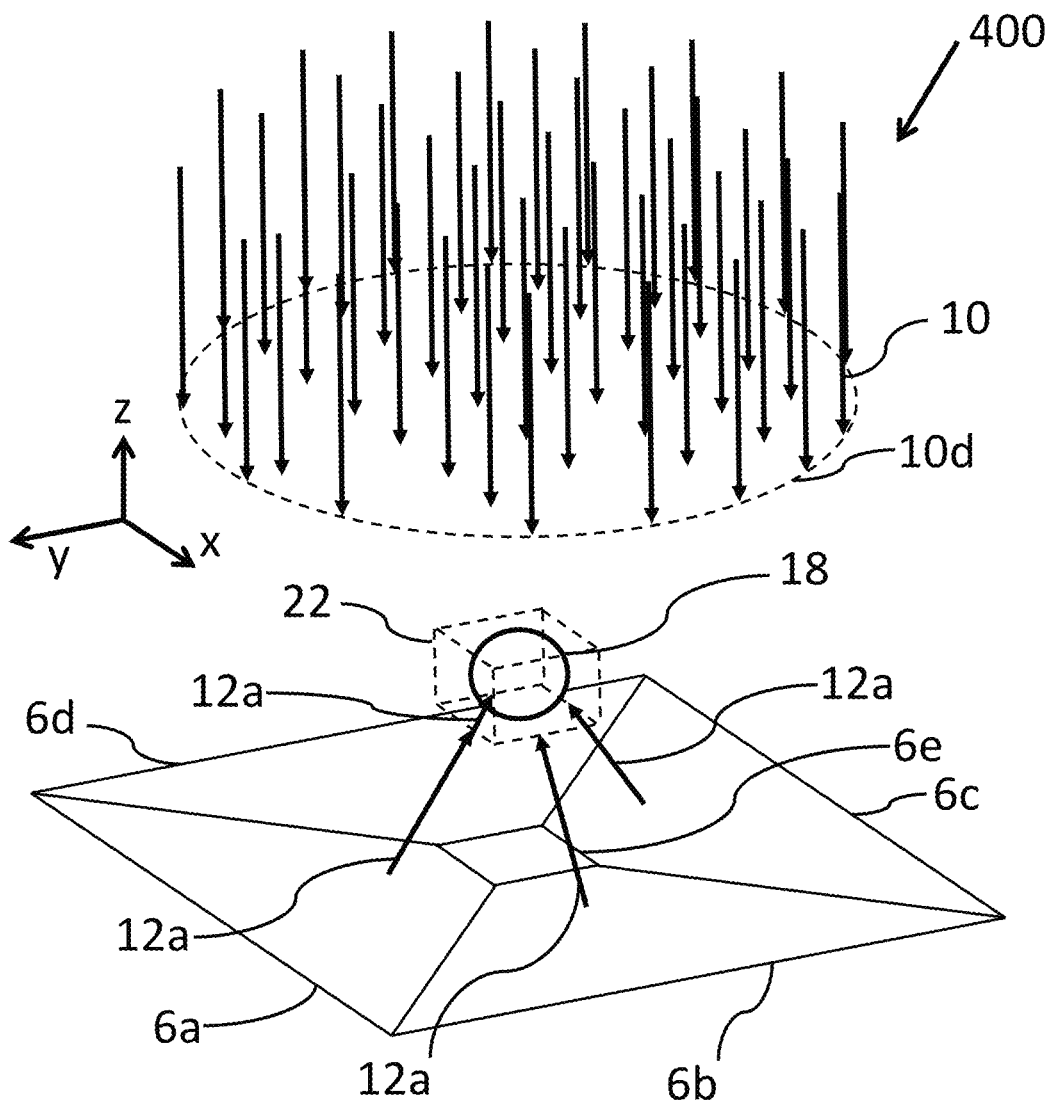
FIG. 5 illustrates the input, reflected, and diffracted light beams of a three-dimensional magneto optical trap (3D GMOT)

FIG. 5 illustrates a 3D GMOT 400. Like the 2D GMOTs 100 and 200, 3D GMOT 400 includes an input light beam 10 directed along a first axis, labeled the z-axis in FIG. 5. Input light beam 10 has an area 10d extending in a second and third axis, the second and third axes are perpendicular to the first axis and labeled as the x and y-axis in FIG. 5. Input light beam 10 in FIG. 5 might have a similar intensity profile across the area 10d as the intensity profile 10a described in relation to 2D GMOTs 100 and 200 illustrated in FIGS. 1 and 3.

FIG. 5 further illustrates diffraction gratings 6a, 6b, 6c, and 6d with their respective diffraction grating surfaces. The diffraction grating surfaces of 6a, 6b, 6c, and 6d are comprised of closely adjacent parallel grooves (not shown) that run substantially parallel to their longest outside edge of their respective diffraction grating surface. In other words, the adjacent parallel grooves of diffraction gratings 6a and 6c run along the x-axis and the adjacent parallel grooves of diffraction gratings 6b and 6d run along the y-axis, as illustrated in FIG. 5.

Diffraction gratings 6a, 6b, 6c, and 6d are combined to form a gap 6e at the center of the diffraction gratings 6a, 6b, 6c, and 6d. The gap 6e prevents the reflection of zeroth order light beams (not shown) directly above the gap (along the z-axis).

As in the 2D GMOTS 100, 200, and 300, the cooling of atoms in the 3D GMOT 400 occurs through Doppler cooling. Opposing beams of light with the correct frequency and polarization may strike an atom such that the atom absorbs a photon and receives a small push in the direction of the striking light beam.

Diffraction gratings 6a, 6b, 6c, and 6d diffract first-order light beams 12a. In embodiments, the diffracted first-order light beams 12a and the single input light beam 10 intersect at an intersection region 22 above the gap 6e formed between the surfaces of the diffraction gratings 6a, 6b, 6c, and 6d. A cold atom cloud 18 forms within the intersection region 22.

As in the case of the 2D GMOT described above, with respect to the 3D GMOT, the relative light intensities of the input light beam 10 and the first-order diffracted light beams 12a are configured to provide the necessary forces to help push atoms towards the center of the intersection region 22. In other words, for a trap to form, the sum of the forces on the atoms should be approximately zero. Accordingly, $I_{up}=I_1/n \cos \theta$, where $I_{up}$ is the upward force from the diffracted first-order light beams 12a, $I_1$ is the force exerted by the single input light beam 10, n is the number of diffracted first-order light beams 12a (in the case of this 3D GMOT embodiment, n equals four, since there are four diffraction grating surfaces), and $\theta$ is the angle of the diffracted first-order light beams 12a (in the case of this 3D GMOT embodiment, 0 equals 45). Additionally, the diffracted first order light beams 12a are spatially compressed, meaning their intensity is greater within a shorter area, by a factor of $\cos \theta$. Thus, in the case of the 3D GMOT described herein, $I_{up}=I_1/4$, or the diffracted first order light beams 12a should have an intensity that is roughly 25% of the single input light beam 10.

In addition, in this embodiment, the diffraction grating surface 2a suppresses reflections 12b and diffractions of all other order light beams 12c. As such, the inventor of the present disclosure has found that small deviations, on the order of +/−10%, in the intensity ratio (between the diffracted first order light beams 12a and the single input light beam 10) still produce a trap but move the location of the trap with respect to the magnetic field zero. Thus, a trap may still be formed when the diffracted first-order light beams' intensity is between roughly 15 and 35% of the incoming light beam's intensity. The reflection suppression by the diffraction grating surface 2a and the intensity matching of the incoming light beam 10 and first-order diffracted light beams 12a provide a combined force that helps push atoms towards the center of the magneto-optical trap 400 or the center of the intersection region 22.

Figure 6:
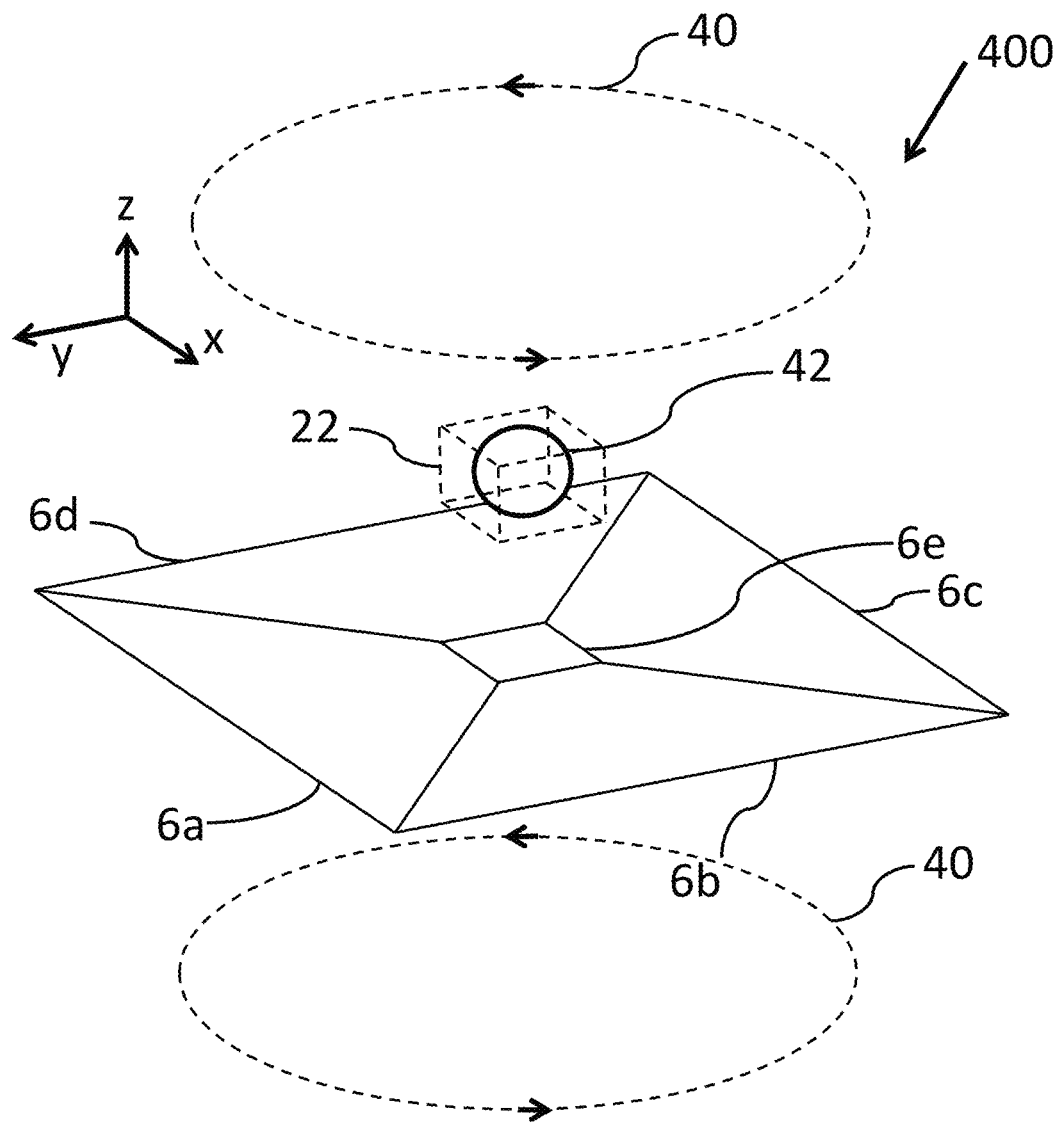
FIG. 6 illustrates a portion of the quadrupole magnetic field of a 3D GMOT.

3D GMOT 400 further comprises a quadrupole magnetic field. For clarity purposes, the quadrupole magnetic field that is part of the magneto-optical trap 400 is not shown in FIG. 5 but a portion of it is shown in FIG. 6, with its position relative to the intersection region 22 and the diffraction gratings 6a, 6b, 6c, and 6d. A magnetic field at any given point may be specified as having both a direction and a magnitude. However, if the magnitude is zero at a given point, the direction is also zero. For clarity purposes, FIG. 6 does not show all the field vectors of the quadrupole magnetic field 40. However, the force and direction of quadrupole magnetic field 40 are zero at the center of the intersection region 20, or the center 42 of the quadrupole magnetic field 40 is zero.

Figure 7:
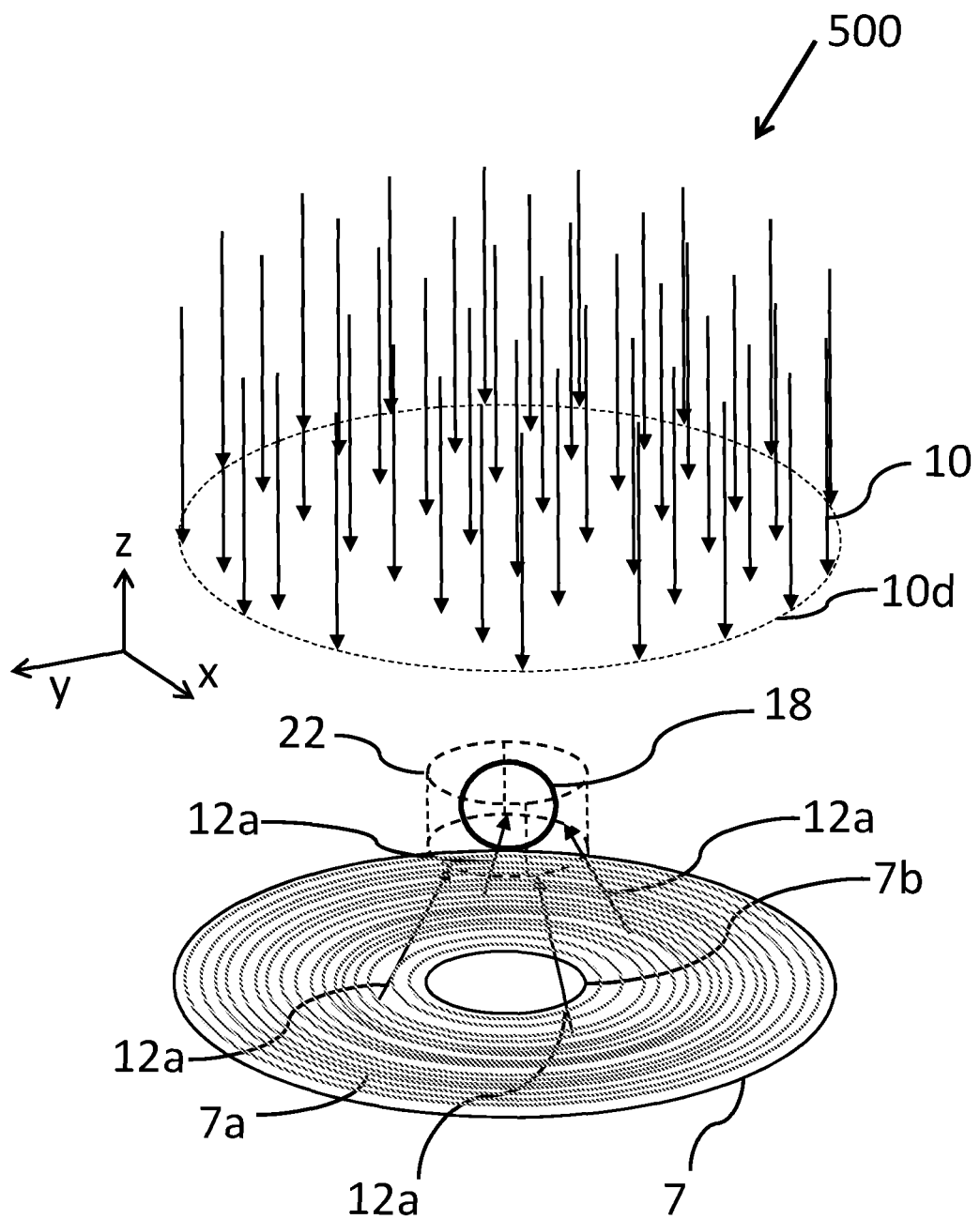
FIG. 7 illustrates another 3D GMOT.

In other embodiments, FIG. 7 illustrates 3D GMOT 500 with a circular diffraction grating 7, diffraction grating surface 7a, and a hole 7b formed in the center of the diffraction grating 7. Diffraction grating surface 7a comprises closely concentric circular grooves.

Like previous GMOTs disclosed herein, 3D GMOT 500 comprises a single input light beam 10 directed along a first axis, labeled the z-axis in FIG. 7. Input light beam 10 has an area 10d extending in a second and third axis, the second and third axis being perpendicular to the first axis and labeled as the x and y-axis in FIG. 7. Input light beam 10 in FIG. 7 might have a similar intensity profile across the area 10c as the intensity profile described in relation to FIGS. 1, 3, and 5.

Diffraction grating 7 forms a hole in its center. The hole 7 prevents the reflection of zeroth order light beams (not shown) directly above the gap (along the z-axis).

Diffraction grating 7 diffracts first-order light beams 12a. In embodiments, the diffracted first-order light beams 12a and the input light beam 10 intersect at an intersection region 22 above the hole 7 formed at the center of diffraction grating 7. A cold atom cloud 18 forms within the intersection region 22.

Similar to 3D GMOT 400, 3D GMOT 500 comprises a quadrupole magnetic field that is not shown, however, its description is similar to that described in relation to quadrupole magnetic field 40 illustrated in FIG. 6.

Figure 8:
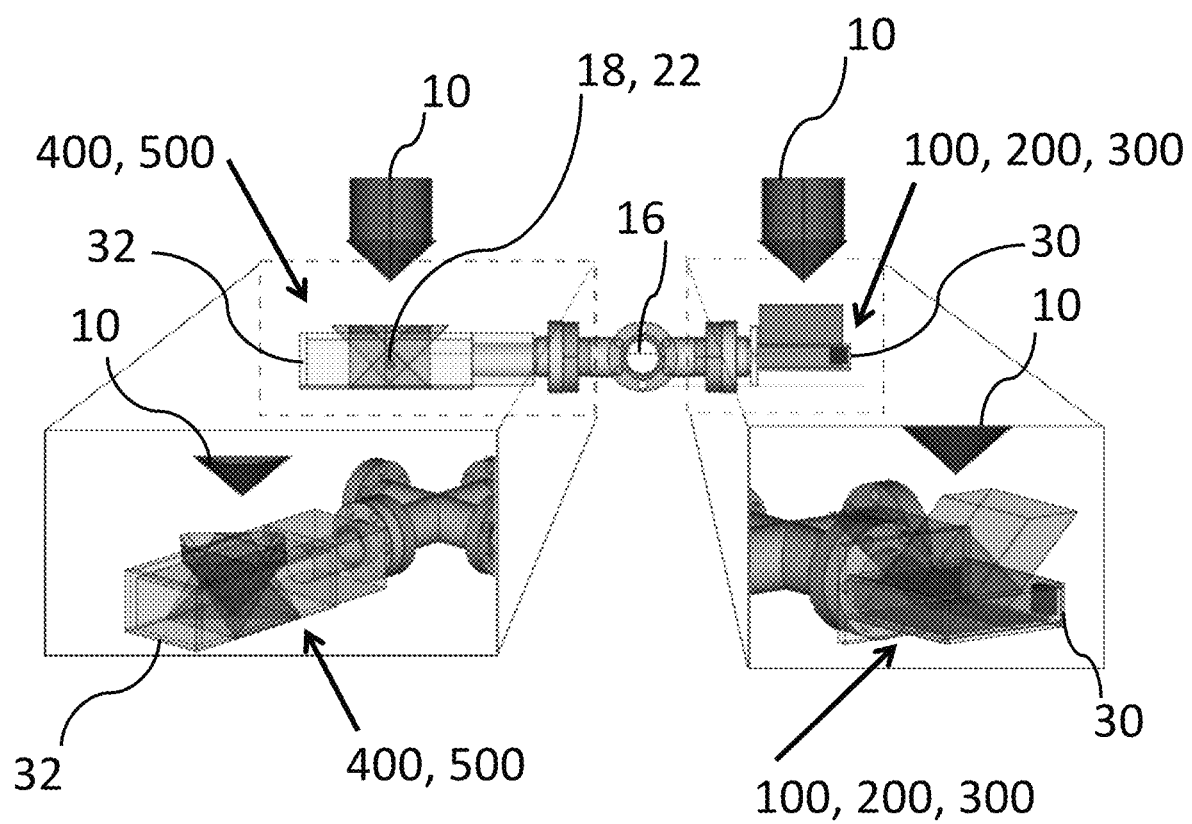
FIG. 8 illustrates a 2D GMOT providing a stream of atoms to a 3D GMOT.

FIG. 8 illustrates a 2D GMOT, such as 2D GMOTs 100, 200, or 300, providing a stream of atoms 16 that is captured by a 3D GMOT, such as 3D GMOT 400 or 500. FIG. 8 further illustrates a single input light beam 10 for each of the 2D and 3D GMOTS. As can be seen in FIG. 8, the 2D and 3D GMOTs are configured to enable an experimenter to interact from all sides of the GMOTs without obstruction from other input light sources or other lab equipment necessary to form an atomic beam or an atomic cloud. Additionally, the GMOT configurations illustrated in FIG. 8 require less laser power as compared to other MOTs that have multiple input light beams.

In FIG. 8, the 2D GMOT 100, 200, or 300 resides in vacuum cell 30 and the 3D GMOT 400 or 500 resides in a second vacuum cell 32. The 2D GMOT 100, 200, or 300 may be capped by a silicon reflector with a pinhole (not shown). The atom beam 16 travels through the pinhole from the 2D GMOT 100, 200, or 300 to the 3D GMOT 400 or 500. The atomic beam 16 from the 2D GMOT 100, 200, or 300 enables higher atom number capture and loading rates in the 3D GMOT 400 or 500 by separating the source vapor (in vacuum cell 30) from the experimental region (in vacuum cell 32). Separating the source vapor from the experimental region in this configuration further enables greater access by an experimenter to the experimental region.

Figure 9:
FIGS. 9 and 10 illustrate black and white photographs illustrating the actual results of a 2D GMOT and a 3D GMOT, respectively.
Figure 10:
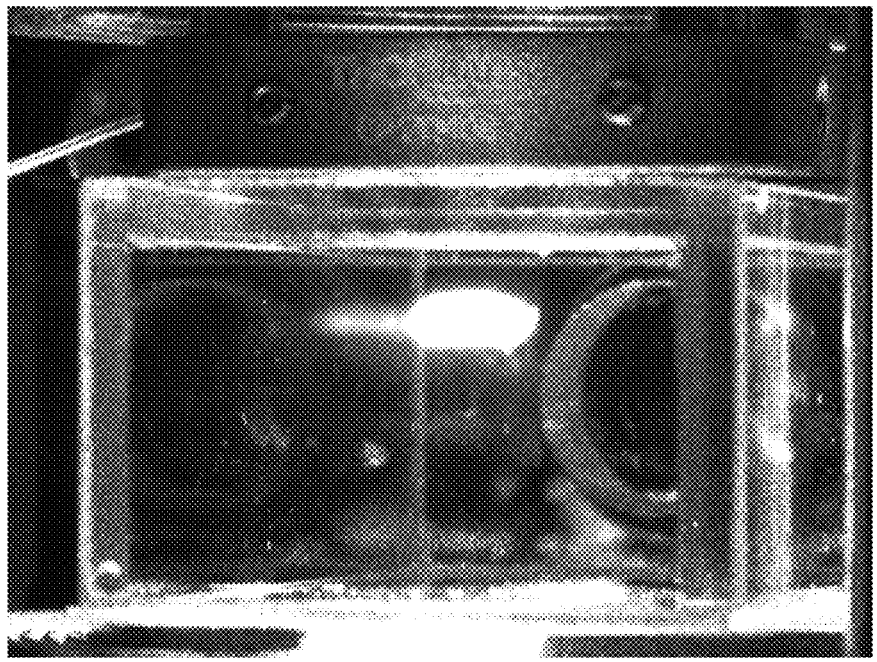

FIGS. 9 and 10 are black and white photographs illustrating the actual results of a 2D and 3D GMOTs, respectively. FIG. 9 shows a 2D GMOT producing an atom beam (shown as the white region). FIG. 10 shows a 3D GMOT producing an atom cloud (also shown as a white region or cloud).

The following examples are illustrative only and are not intended to limit the disclosure in any way.

Examples

The inventor of the present disclosure built functional two-dimensional and three-dimensional grating magneto-optical trap (2D and 3D GMOTs). This included a vacuum chamber of bonded anti-reflection coated borosilicate glass. The six-sided, rectangular chamber measured 89×32×35 mm, with a large hole cut into one of the 32×35 mm faces which was bonded to a vacuum pumping system. One of the 89×32 mm faces of the chamber was a 1 mm thick sapphire wafer. The evacuated chamber operated at pressures low as $10^{-9}$ Torr, or lower.

The relatively high (45%) efficiency requirements of the 2D GMOT preclude many grating types. Any grating without a preferred direction would have to diffract practically all input into the +/− first orders.

Non-direction etched gratings have been fabricated to this standard, albeit with a high input of design time and fabrication cost. Such gratings often require e-beam lithography for small (≈500 nm) feature seizes. E-beam lithography for large area gratings monopolizes clean-room facilities making them prohibitively expensive.

Replicated blazed gratings are inexpensive, but design choices are confined to commercially produced masks. Additionally, these gratings are not designed to minimize reflections, which can undermine trap performance by producing an additional beam with a typically anti-trapping polarization. GMOT designs with blazed gratings have gaps between gratings along the central axis to allow light to pass (as shown in FIGS. 3, 5, and 6).

The inventor obtained two 45×12 mm, 18-degree blazed diffraction gratings, with parallel grooves along the long axis at 900 grooves/mm and 1000 nm-blaze wavelength, with equal linear polarization efficiencies near 60%. The equal linear polarization resulted in a circularly polarized diffracted beam. The inventor placed the grating surfaces against the glass surface opposite the sapphire wafer. The gratings were aligned parallel to the 89-mm axis of the vacuum chamber and separated from each other by 5 mm. The blazes were oriented towards the gap separating the gratings.

The inventor then dispensed $^{87}$Rb atoms into the chamber. A laser and amplifier system produced coherent light at 780.246 nm wavelength, while a separate laser produced coherent light at 780.232 nm wavelength. The two beams were combined, linearly polarized, and input into a common polarization-maintaining optical fiber. The fiber output 70 mW of optical power at 780.236 nm and 12 mW at 780.232 nm. The light was expanded with two-inch optics and circularly polarized before being directed through the sapphire window, into the chamber, and towards the gratings.

The light diffracted off the gratings at an angle of 44.5 degrees. The intensity of the light impinging on the grating was diffracted into the blaze-preferred first order with an overall efficiency near 60%. The diffracted light was mostly of the opposite circular polarization as the input beam. A region of space was formed inside the vacuum chamber in which the input and preferred first order beams overlapped. The cross-sectional area of this region was approximately 6 mm$^2$.

A two-dimensional quadrupole magnetic field was generated using four 2×0.125×0.25 inch permanent magnets arranged at the corners of the vacuum chamber. The two-inch magnet axes were parallel to the 89-mm axis of the chamber. The main axis of the field was directed along the direction of the input light beam. The location where the magnetic field was zero was set within the overlapping area of the input and diffracted light beams. The gradient of the field near the zero location was 30 G/cm.

The existence of a 2D-GMOT was verified by observing the atomic fluorescence with a CCD camera imaging the plane of the overlapping beams (as shown in FIG. 8). The high atomic density at the center of the magnetic field was evidenced by a high fluorescence at that location. The high-density region could be moved by displacing the magnetic field's zero region. Additionally, the density could be optimized by shifting the input light's circular polarization. The high-density region disappeared when the 780.232 nm light was removed. These factors are indicative of a magneto-optical trap.

In another experimental setup, the inventor of the present disclosure used two glass vacuum cells separated by a mini-conflat flange. The 2D GMOT was produced in a chamber 30×40×72 mm$^3$, which is capped by a silicon reflector with a 1 mm-diameter pinhole. The atom beam traveled through the pinhole, through a second filtering 3 mm pinhole in the copper gasket of the conflat cross. The atoms were then collected on the opposing side of the cross in a 3D GMOT in a chamber that is 25×40×85 mm$^3$. All glass walls were anti-reflection coated on both sides at 780 nm.

In this experiment, the inventor located the gratings outside the vacuum chamber. The added optical path through the glass chamber surface modifies the intensity and polarization of the diffracted beams. As a result, the inventor used gratings with 830 grooves/mm for 800 nm wavelength. A normally incident, circularly polarized beam input beam diffraction through the chamber wall will have 64% of the original intensity and be 90% polarized with the opposite handedness.

In this same experiment, for the 2D GMOT, the inventor used two 17.5×38 mm$^2$ rectangular gratings with their blazes facing towards their common axis, separated by a 5-mm gap. For the 3D GMOT, the inventor used four trapezoidal gratings such that when combined they produced a 38×38 mm² square with a 4×4 mm² gap at its center (as illustrated in FIG. 5). Again, all the blazes point towards the central axis. However, the 3D GMOT requires an efficiency closer to 25%. To reduce the diffracted beam power, a 0.1 ND filter was placed between the gratings and the vacuum chamber wall.

A single laser beam was input into each chamber. Each beam carried 11.0 mW/cm² light at the cooling (detuned $5^2S_{1/2} \rightarrow 5^2S_{3/2}$, F=2→3, Δ=−1.3 Γ) transition and 3.8 mW/cm² (F=1→2) at the repump transition for $^{87}$Rb. The light was emitted from a single mode, polarization-maintaining fiber and expanded through a negative lens. A wide-angle quarter wave plate provides circular polarization to the expanding beam, which is then reflected from a two-inch mirror and collimated with a 100-mm focal length lens.

A "push" beam was directed along the 2D GMOT axis to provide enhanced cooling, using 3.3 mW of cooling light in a beam with a 4-mm waist. The beam was retro-reflected using a silicon mirror.

The 2D GMOT magnetic fields were provided by four permanent neodymium magnets arranged on cage rods outside the chamber. They were positioned via a three-axis translation stage and a tip-tilt mirror mount to aid alignment of the 2D GMOT with the silicon pinhole. They provided an extended quadrupole field with a 20 G/cm gradient.

The 3D GMOT magnetic fields were produced by an anti-Helmholtz coil pair, centered by the cage rods that aligned the 3D GMOT optics. Running a 1.2 A current, they provided a gradient of 10 G/cm in the axial direction.

The system was evacuated to a pressure of 2×10⁻⁹ Torr, measured using a residual gas analyzer.

The 3D GMOT fluorescence was monitored using a photodiode from Thorlabs (PDA100A). Light from the GMOT was collected using a f=25.4 mm lens positioned 2f from the trap and the sensor surface.

Pulsing the 3D GMOT's magnetic field off and on produced a rising fluorescence signal proportional to the number of captured atoms. By monitoring the 3D GMOT fluorescence as a function of time, the 2D GMOT beam could be characterized. An 8-mW "plug" laser beam was positioned just after the exit pinhole. The beam acted to misalign the atomic beam from the 2D GMOT, which reduced the capture rate of the atoms. When the plug beam was turned off for a short period, the 3D GMOT would grow as atoms traversed the distance from the exit pinhole to the 3D GMOT atomic cloud.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

I claim:

1. A three-dimensional grating magneto optical trap (3D GMOT) comprising:
    a single input light beam having its direction along a first axis, an area along a second and third axis that are both normal to the first axis, and a substantially flat input light beam intensity profile extending across its area;
    a circular, diffraction-grating surface positioned normal to the first axis and extending along the second and third axis; the circular, diffraction-grating surface having closely adjacent grooves arranged concentrically around a gap formed in the center of the circular, diffraction-grating surface;
    the circular, diffraction-grating surface configured to:
        diffract first-order light beams that intersect within an intersection region that lies directly above the gap, and
        suppresses reflections and diffractions of all other orders; and
    a quadrupole magnetic field with its magnitude being zero within the intersection region;
    wherein the 3D GMOT is configured to trap a cold-atom cloud within the intersection region.

2. The 3D GMOT of claim 1, wherein each of the diffracted first-order light beam's intensity is between 15 and 35% of the input light beam's intensity.

3. A method for trapping a cold-atom cloud, the method comprising providing a three-dimensional grating magneto optical trap (3D GMOT), comprising:
    providing a first, single input light beam having its direction along a first axis, an area along a second and third axis that are both normal to the first axis, and a substantially flat input light beam intensity profile extending across its area;
    providing a circular, diffraction-grating surface positioned normal to the first axis and extending along the second and third axis; the circular, diffraction-grating surface having closely adjacent grooves arranged concentrically around a gap formed in the center of the circular, diffraction-grating surface;
    the circular, diffraction-grating surface configured to:
        diffract first-order light beams that intersect within an intersection region that lies directly above the gap, and
        suppresses reflections and diffractions of all other orders; and
    providing a quadrupole magnetic field with its magnitude being zero within the intersection region;
    wherein the 3D GMOT is configured to trap the cold-atom cloud within the intersection region.

4. The method of claim 3, wherein each of the diffracted first-order light beam's intensity is between 15 and 35% of the input light beam's intensity.

* * * * *